United States Patent [19]

Komiya et al.

[11] 4,453,187
[45] Jun. 5, 1984

[54] IMAGE SENSOR
[75] Inventors: Kazumi Komiya; Minoru Kanzaki, both of Yokosuka, Japan
[73] Assignee: Nippon Telegraph & Telephone Public Corporation, Tokyo, Japan
[21] Appl. No.: 388,396
[22] Filed: Jun. 14, 1982
[30] Foreign Application Priority Data
  Jun. 25, 1981 [JP] Japan .................................. 56-97535
  Sep. 30, 1981 [JP] Japan .................................. 56-156634
[51] Int. Cl.³ ............................................... H04N 3/14
[52] U.S. Cl. ................................................... 358/213
[58] Field of Search ......................................... 358/213
[56] References Cited
U.S. PATENT DOCUMENTS
  4,314,279 2/1982 Yoshida ............................... 358/213

Primary Examiner—Richard Murray
Attorney, Agent, or Firm—Pollock, Vande Sande & Priddy

[57] ABSTRACT

A plurality of photoconductive cells are each formed on an insulating substrate to extend in a straight line. The photoconductive cells are divided into m groups, each consisting of n cells, which is connected at one end to a common electrode, and corresponding ones of the photoconductive cells of the m groups are connected to individual select electrodes, respectively. By turning ON group select switches in a sequential order, the common electrodes are connected to a power source one at a time and, by sequentially turning ON individual select switches, the individual select electrodes are connected to a load one at a time. The common electrodes are grounded via grounding switches which operate reversely from select switches connected to the common electrodes. The individual select electrodes are grounded via grounding switches which operate reversely from select switches connected to the individual select electrodes. The resistance value of the load is selected sufficiently smaller than the composite resistance value of the photoconductive cells connected in parallel to the load when one of the group select switches and one of the individual select switches are both in the ON state.

8 Claims, 18 Drawing Figures

IMAGE SENSOR

BACKGROUND OF THE INVENTION

The present invention relates to an image sensor which is employed for reading out, for instance, printed material for facsimile transmission, and converts an image into a corresponding electric signal.

Of image sensors heretofore used in facsimile, there is an image sensor that is formed by a silicon chip of a size about 20 to 30 mm$^2$ and having incorporated therein 2000 or so photo diodes and a scanning circuit therefor through utilization of MOS (Metal-Oxide-Semiconductor), CCD (Charge Coupled Device) or like semiconductor integrated circuit technology. In order to read out, for example, a printed page by this image sensor, it is necessary to form a reduced image on the sensor through using a lens and, to perform this, the optical path length from the printed page to the sensor, resulting in the equipment becoming bulky as a whole. For example, in the case of an A4-size printed page (200 mm wide) the reduction ratio for forming reduced images on the sensor using a lens with a focal length f of 50 mm is about 1/10 and the optical path length exceeds 500 mm. Further, this image sensor involves complex adjustment for image formation and employs a fluorescent lamp as a light source, but its lifetime is short.

As a solution to such defects, there have been proposed large image sensors of the same size as the width of the printed page. According to one of such large image sensors, a number of optoelectro transducers are formed in a line through the thin film technology and the length of the optoelectro transducer array is made identical with the width of the printed page. The printed page is held substantially in close contact with the sensor, permitting the readout of the printed page without using a reducing lens. Some of such image sensors employ a drive circuit exclusively for each optoelectro transducer as scanning circuits for sequentially taking out the outputs from the optoelectro transducers. In this case, for instance, when the number of optoelectro transducers used is 1728, the number of connection points of external integrated circuits for the scanning circuit and the optoelectro transducers is large and the number of integrated circuits for the scanning circuits is also large; accordingly, this method is economically disadvantageous.

In such an image sensor which reads out written, typed, printed or photographic material held in close contact therewith, it has been proposed, with a view to reducing the number of connection points of the integrated circuits as scanning circuits for taking out the optoelectro transducer outputs and the optoelectro transducers, to adopt what is called matrix wiring and connect the optoelectro transducer at the intersections of row and column lines so that the transducers are selectively energized by selecting the row and column lines one by one. In the image sensor utilizing the matrix wiring, however, the so-called cross talk occurs, extremely lowering the SN ratio. To avoid this, it is customary in the prior art to connect a blocking diode in series to each optoelectro transducer and cut off the crosstalk through utilization of the backward characteristic of the blocking diode as set forth, for example, in U.S. Pat. No. 3,544,713 ("Solid State Electro-Optical Contact Scanner" issued on Dec. 1, 1970). With this method, however, a special manufacturing step is required for forming the blocking diodes on the same substrate together with the optoelectro transducers and, in addition, it is difficult to make the forward contact resistances and the backward resistances of the blocking diodes uniform, which leads to dispersion in the transducer outputs. Accordingly, this image sensor necessitates the use of a compensation circuit for compensating for such dispersion, and hence is uneconomical. Besides, since the optoelectro transducers cannot be selected and driven at high speed owing to the presence of the blocking diodes, the image sensor can be used only with low-speed facsimile.

SUMMARY OF THE INVENTION

It is therefore an object of the present invention to provide an image sensor which employs optoelectro transducers formed as thin film elements, and hence is able to operate in close contact with written, typed or like material for reading it out, and which does not involve the blocking diodes.

Another object of the present invention is to provide an image sensor which is small in the number of connection points of optoelectro transducers and integrated circuits for scanning them, simple in manufacturing process, high in yield, excellent in stability, small in dispersion in output and capable of high-speed operation.

Yet another object of the present invention is to provide an image sensor which is capable of high-speed operation.

According to the present invention, a plurality of photoconductive cells are formed, for instance, in a line on an insulating substrate and the photoconductive cells are virtually divided into m groups, each consisting of n cells (n and m being integers larger than unity). The photoconductive cells of each group are connected at one end to a corresponding one of m common electrodes, and corresponding ones of the photoconductive cells of the m groups are each connected at the other end to a corresponding one of n individual select electrodes. The photoconductive cells, the common electrodes and the individual select electrodes are formed on the aforementioned insulating substrate through the thin film technology, and they are interconnected by the so-called matrix wiring. M group select switches are connected at one end to the m common electrodes, and these group select switches are sequentially turned ON by sequential application thereto of group select pulses from a group select driver. N individual select switches are connected at one end to the n individual select electrodes, and these individual select switches are sequentially turned ON by sequential application thereto of individual select pulses from an individual select driver. In general, the frequency of the group select pulses is selected to be n times higher than the frequency of the individual select pulses. Either one of the group select switches and the individual select switches is connected to a common drive power source and the other is connected to a common load.

In the present invention, grounding means is connected to each of the common electrodes and each of the individual select electrodes. One of the photoconductive cells is selected which is connected to one of the group select switches and one of the individual cell select switches held in the ON state at the same time, and the output of the selected cell is provided to the load. The common electrode grounding means are to ground one ends of the photoconductive cells connected to those of the group select switches held in the OFF state, without substantially affecting the output of the selected cell. The common electrode grounding means are grounding switches which are each connected, for instance, between each common electrode and the ground and controlled reversely from the group select switch connected to the common electrode. Alternatively, the common electrode grounding means are grounding resistors which are each connected between each common electrode and the ground, and the resistance value of each resistor is selected small within such a range that the composite resistance value of all photoconductive cells connected in parallel to the load when one photoconductive cell is selected is sufficiently larger than the resistance value of the load, that is, two or more orders of magnitude over the latter. Each individual select electrode grounding means is also constituted as a grounding switch which operates reversely from the individual select switch connected to the individual select electrode, or as a grounding resistor and, in the case of the grounding resistor, its resistance value is selected in the same manner as described above. The resistance value of the load is selected sufficiently small as compared with the composite resistance value of the photoconductive cells connected in parallel to the load in the state of one photoconductive cell being selected; namely, the resistance value of the load is selected, for instance, 2% or less of the abovesaid composite resistance value. It is preferable that the group select switches and the individual select switches be of the same construction, and that the common electrode grounding means and the individual select electrode grounding means be also of the same construction. When the common electrode grounding means and the individual select electrode grounding means are formed as grounding switches, it is preferred to constitute the group select switches and the group electrode grounding means as an integrated circuit and to use a similar integrated circuit for the individual select switches and the individual select electrode grounding means. The individual select switches are sequentially distributed and connected to L loads and successive L individual select switches are simultaneously turned ON. In the ON period of these individual select switches, the outputs from the L loads are sample-held in sample hold circuits sequentially shifting the loads outputs by 1/L period, and the L sample-held outputs are sequentially combined. In this way, it is possible to obtain an output L times the period with which each photoconductive cell is selectively driven. dr

DESCRIPTION OF THE PREFERRED EMBODIMENTS

To facilitate a better understanding of the present invention, a description will be given first, with reference to FIG. 1, of a conventional image sensor.

Photoconductive cells $R_{11}$ to $R_{mn}$ as of CDS material are closely arranged in a line in a sequential order to constitute a photoconductor array 1, and blocking diodes $D_{11}$ to $D_{mn}$ are each connected in series at one end to one end of one of the photoconductive cells $R_{11}$ to $R_{mn}$. The photoconductive cells $R_{11}$ to $R_{mn}$ are sequentially divided into m groups $R_1, R_2, \ldots R_m$, each consisting of n photoconductive cells. That is to say, the m photoconductive cell groups $R_1, R_2, \ldots R_m$ include the photoconductive cells $(R_{11}, R_{12}, \ldots R_{1n})$, $(R_{21}, R_{22}, \ldots R_{2n})$, $\ldots (R_{m1}, R_{m2}, \ldots R_{mn})$, respectively. For instance, in this case of one scanning line for reading out printed matter in facsimile being constituted by 1728 picture elements, 1728 photoconductive cells are used and they are divided into 54 groups by steps of 32. The photoconductive cells of the m groups $R_1, R_2, \ldots R_m$ are connected at one ends thereof to common electrodes $C_1, C_2, \ldots C_m$, respectively, which are, in turn, connected to group select switches $M_1, M_2, \ldots M_m$ at one side thereof, respectively. The group switches $M_1$ to $M_m$ are formed, for example, by field effect transistors. The other ends of the group select switches $M_1$ to $M_m$ are connected via a common voltage terminal 9 to a DC power source 21. A group select clock is applied from a group select clock input terminal 7 to a group select driver 5 and, upon each occurrence of the clock, the group select driver 5 yields an output at one of its m output terminals. The m output terminals of the group select driver 5 are respectively connected to those of control terminals $a_1$ to $a_m$ of the group select switches $M_1$ to $M_m$ corresponding thereto. The group select switches $M_1$ to $M_m$ constitute a group select section 3.

The other ends of the blocking diodes $D_{11}$ to $D_{mn}$ connected to the corresponding ones of the photoconductive cells of the photoconductive cell groups $R_1$ to $R_m$ are connected to those of n individual output electrodes $T_1$ to $T_n$ corresponding to them, respectively. The n individual output electrodes $T_1$ to $T_n$ are, in turn, connected to those of individual select switches $N_1$ to $N_n$ corresponding to them, respectively. The individual select switches $N_1$ to $N_n$ are formed, for instance, by field effect transistors. The other ends of the individual select switches $N_1$ to $N_n$ are grounded via a common load resistor 10. An individual select clock is applied from an individual select clock input terminal 8 to an individual select driver 6 and, upon each occurrence of the clock, the individual select driver 6 yields an output at one of its n output terminals. The n output terminals of the individual select driver 6 are respectively connected to those of control terminals $b_1$ to $b_n$ of the individual select switches $N_1$ to $N_n$ corresponding to them. The individual select switches $N_1$ to $N_n$ constitute an individual select section 4. The switches $N_1$ to $N_n$ connected to the side of the load 10 are analog switches. The clocks at the terminals 7 and 8 are synchronized in phase and the frequency of the group select clock at the terminal 7 is N times higher than the frequency of the individual select clock at the terminal 8.

Group select pulses, each provided at the output of the group select driver 5 upon each application of the group select clock thereto from the group select clock input terminal 7, are sequentially applied to the control terminals $a_1$ to $a_m$ of the group select switches $M_1$ to $M_m$. Through the group select switch $M_i (i=1, 2, \ldots m)$ supplied with the scanning pulse, DC voltage is applied from the terminal 9 to the n photoconductive cells $R_{i1}$ to $R_{in}$ of the group $R_i$ corresponding to the group select switch $M_i$. The photoconductive cell groups which are supplied with the DC voltage from the terminal 9 are sequentially changed over upon each occurrence of the group select clock. While the voltage is being applied to one photoconductive cell group $R_i$, individual select clock pulses are provided from the individual select clock input terminal 8 to the individual select driver 6, the outputs from which are sequentially applied to the control terminals $b_1$ to $b_n$ of the individual select switches $N_1$ to $N_n$ to turn them ON in a sequential order. As a result of this, the photoconductive cells $R_{i1}$ to $R_{in}$ of the selected photoconductive cell group $R_i$ are sequentially selected to be connected to the load resistors 10 and currents corresponding to the resistance values of the photoconductive cells $R_{i1}$ to $R_{in}$ are changed over one after another to flow to the load resistor 10. Since the resistance value of each photoconductive cell corresponds to the intensity of light incident to the photoconductive cell, an electrically converted output of the light incident to each photoconductive cell is obtained in the load resistor 10.

By holding, for instance, printed matter (not shown) for facsimile transmission substantially in close contact with the photoconductive cell array 1, electric signals corresponding to the black-and-white darkness or intensity of picture elements of the printed matter at the locations where the photoconductive cells lie are obtained in succession in the load resistor 10. By moving the printed matter in a direction perpendicular to the direction of arrangement of the photoconductive cells, the printed matter is read out.

With the abovesaid conventional image sensor, it is necessary to connect the blocking diodes $D_{11}$ to $D_{mn}$ to the photoconductive cells $R_{11}$ to $R_{mn}$, respectively, so as to prevent crosstalk which is caused by parallel connection of unselected photoconductive cells when one photoconductive cell is being selected. For instance, if the photoconductive cell $R_{11}$ is selected in the case where the blocking diodes $D_{11}$ to $D_{mn}$ are not employed in FIG. 1, a current corresponding to the resistance value of the photoconductive cell $R_{11}$ flows via a route [terminal 9—group select switch $M_1$—photoconductive cell $R_{11}$—individual select switch $N_1$—load resistor 10—ground]but, in addition to this signal current, a crosstalk current flows, for example, via a route [terminal 9—group select switch $M_1$—photoconductive cells $R_{12}$—$R_{22}$—$R_{21}$—individual select switch $N_1$—lead resistor 10—ground] and many other crosstalk current paths are set up as shown in FIG. 2.

Thus, crosstalk currents flow which passed through the photoconductive cells $R_{12}$ to $R_{1n}$ of the selected photoconductive cell group $R_1$ other than the selected cell $R_{11}$ and those photoconductive cells of all the other photoconductive cell groups $R_2$ to $R_m$ corresponding to the cells $R_{12}$ to $R_{1n}$. To prevent such crosstalk currents, the prior art image sensor requires the blocking diodes $D_{11}$ to $D_{mn}$ for connection with the photoconductive cells $R_{11}$ to $R_{mn}$ as shown in FIG. 1.

Figure 2:
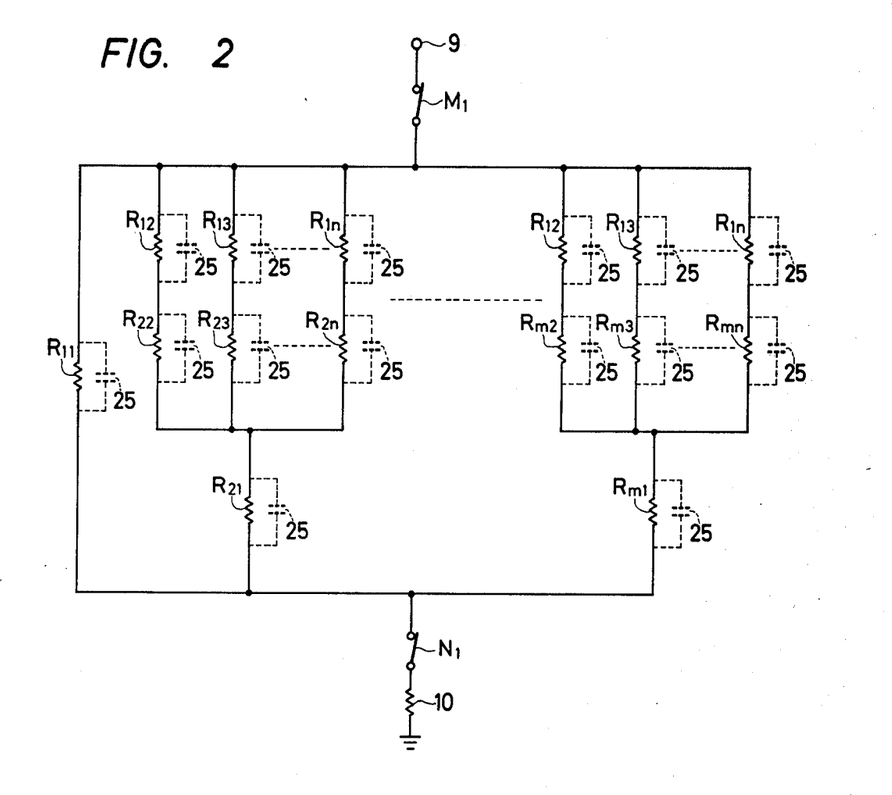
FIG. 2 is a diagram showing an equivalent circuit of the image sensor of FIG. 1 in the case where blocking diodes $D_{11}$ to $D_{mn}$ are omitted and a photoconductive cell $R_{11}$ is selected.
Figure 3:
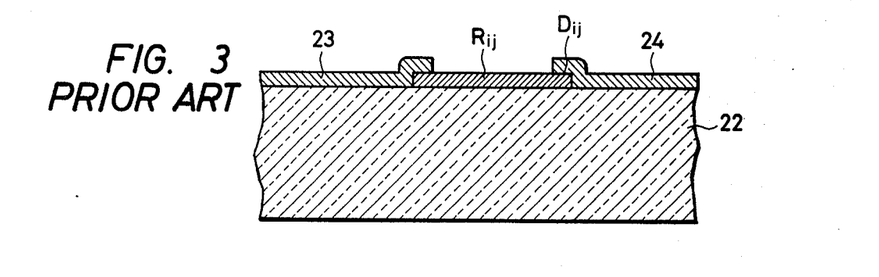
FIG. 3 is a cross-sectional view illustrating an example of the formation of a blocking diode in the conventional image sensor.

By the way, the photoconductive cells and the blocking diodes are formed as shown in FIG. 3. That is, the photoconductive cell $R_{ij}$ as of CdS is formed by vapor deposition on an insulating substrate 22 as of glass through using the thin film technology. At one end of the photoconductive cell is formed an electrode 23 by evaporation. A tellurium film 24 is formed by evaporation in conect with the other end of the photoconductive cell $R_{ij}$, thereby forming the blocking diode $D_{ij}$ at the junction between the photoconductive cell $R_{ij}$ and the tellurium film 24. It is extremely difficult that the contact of the photoconductive cell $R_{ij}$ with the tellurium film 24 is made uniform for all the photoconductive cells. This introduces dispersion in the forward conduction resistance and backward resistance of the blocking diodes $D_{11}$ to $D_{mn}$ and ultimately leads to dispersion in the converted outputs, making it impossible to correctly detect the resistance values of the photoconductive cells. Further, the fabrication of the conventional image sensor calls for the step of forming the blocking diodes. The stability of the contact of the photoconductive cell with the tellurium film is not clear at present and its reliability for a long period of time is not clear, either. Moreover, the blocking diodes $D_{11}$ to $D_{mn}$ respectively have junction capacitances, so that in the case of using the blocking diodes, for instance, when the photoconductive cell $R_{11}$ is selected, it is necessary to charge up each of all the function capacitances 25 of the diodes connected not only to the selected photoconductive cell $R_{11}$ but also to the photoconductive cells present in the crosstalk current paths as indicated by the broken lines in FIG. 2 before a steady current is obtained at the load resistor 10. For example, in the case where the number of photoconductive cells used is 1728, the overall capacity by the blocking diodes is as large as about 1000 pF and this is added to each electrode capacity to degrade the rise-up characteristic, making it impossible to change over the photoconductive cells at high speed.

Figure 1:
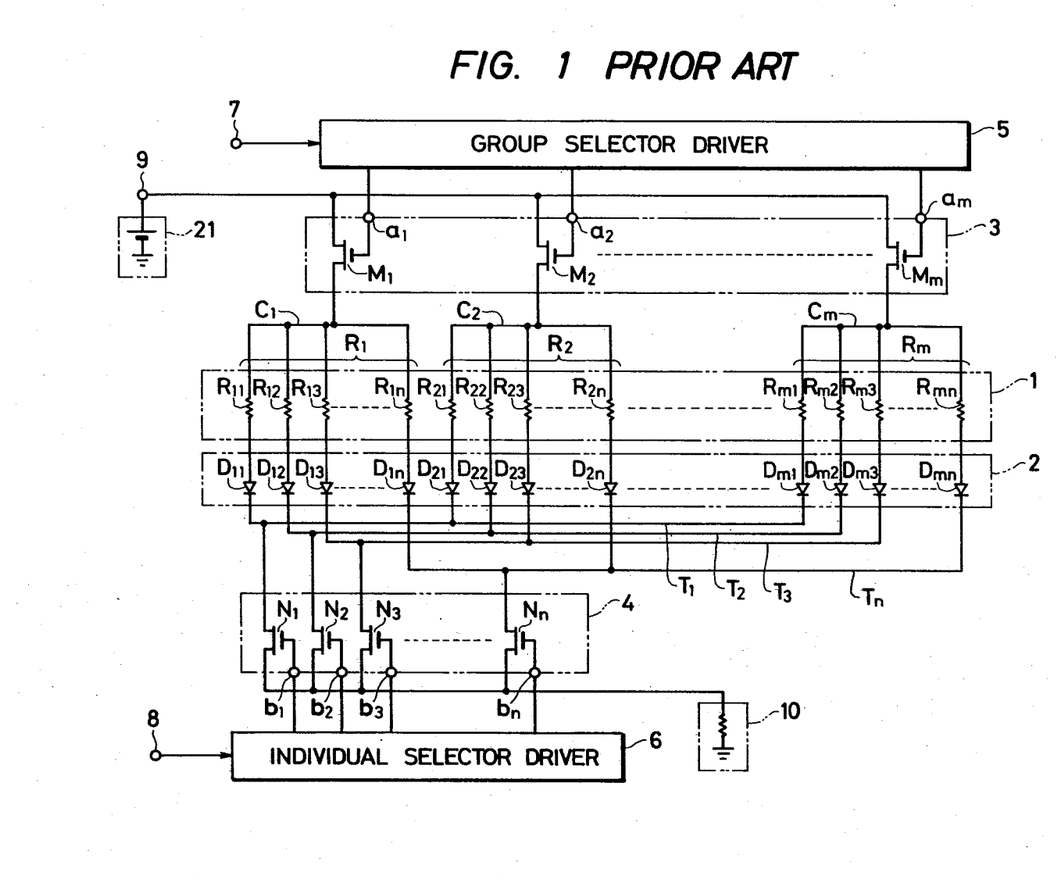
FIG. 1 is a connection diagram showing a conventional image sensor.
Figure 4:
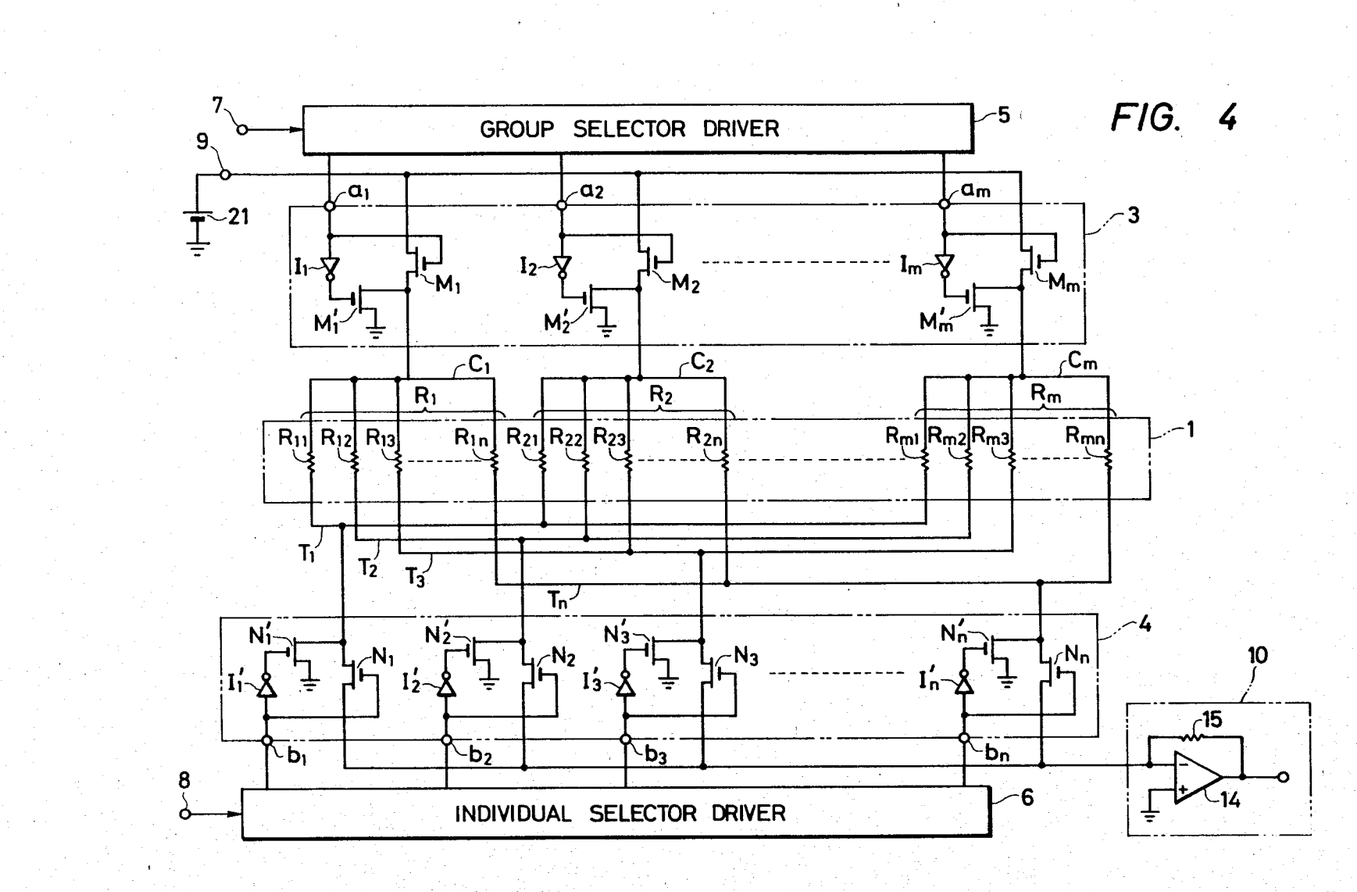
FIG. 4 is a connection diagram illustrating an embodiment of the image sensor of the present invention.

FIG. 4 illustrates an embodiment of the image sensor of the present invention, in which the parts corresponding to those in FIG. 1 are identified by the same reference numerals and characters. In this embodiment, the common electrodes $C_1$ to $C_m$ are grounded via grounding switches $M_1'$ to $M_m'$, respectively, and control terminals $a_1$ to $a_m$ are respectively connected via inverters $I_1$ to $I_m$ to control electrodes of the grounding switches $M_1'$ to $M_m'$. The opposite sides of the corresponding photoconductive cells $R_{11}$ to $R_{mn}$ of the photoconductive cell groups $R_1$ to $R_m$ from the common electrodes $C_1$ to $C_m$ are connected directly to the corresponding ones of the individual select electrodes $T_1$ to $T_n$ by steps of m. As the load resistor 10, a low impedance load of small resistance value is employed. In this embodiment, the low impedance load 10 is shown to be a current-voltage converter which comprises an operational amplifier 14 and a feedback resistor 15 connected between the output end and inverted input end thereof, the non-inverted input end of the operational amplifier 14 being grounded and the individual select switches $N_1$ to $N_n$ being connected together to the inverted input end of the operational amplifier 14. The individual select electrodes $T_1$ to $T_n$ are grounded via grounding switches $N_1'$ to $N_n'$, respectively, and control terminals $b_1$ to $b_n$ are connected to control electrodes of the grounding switches $N_1'$ to $N_n'$ via inverters $I_1'$ to $I_n'$, respectively. The grounding switches $M_1'$ to $M_m'$ and $N_1'$ to $N_n'$ are shown to be FET switching elements.

In the arrangement shown in FIG. 4, the group select clock from the group select clock input terminal 7 is applied to the group select driver 5 and group select pulses therefrom are provided to the control terminals $a_1$ to $a_m$ of the group select switches $M_1$ to $M_m$ in a sequential order. While being supplied with the group select pulse, the group select switches $M_1$ to $M_n$ each remain in the ON state, and the grounding switches $M_1'$ to $M_n'$ each remain in the OFF while the group select pulse is applied to the corresponding one of the control terminals $a_1$ to $a_m$ and in the ON state while the group select pulse is not provided to the corresponding control terminal. While the group select switches $M_1$ to $M_m$ are in the ON state, a DC voltage is applied from the terminal 9 to corresponding ones of the photoconductive cells $R_1$ to $R_m$.

The clock from the individual select clock input terminal 8 is applied to the individual select driver 6, from which individual select pulses are sequentially fed to the control terminals $b_1$ to $b_n$ of the individual select switches $N_1$ to $N_n$, and only the individual select switches supplied with the pulses are turned ON. The grounding switches $N_1'$ to $N_n'$ are turned OFF when those of the control terminals $b_1$ to $b_n$ corresponding thereto are supplied with the pulses, and turned ON when the corresponding control terminals are not supplied with the pulses. For instance, if the individual select switche $N_1$ is turned ON in such a state in which the group select switch $M_1$ is in the ON state and the DC voltage is being applied to the photoconductive cells $R_{11}$ to $R_{1n}$, the photoconductive cell $R_{11}$ is selected and current flowing therethrough is supplied to the load 10 and taken out as an output. While the group select switch $M_1$ is in the ON state, the individual select switches $N_1$ to $N_n$ are turned ON one after another, yielding outputs corresponding to the resistance values of the photoconductive cells $R_{11}$ to $R_{1n}$ of the photoconductive cell group $R_1$ in a sequential order. In this manner, the photoconductive cell groups $R_1$ to $R_m$ are selected and driven in succession and, during the selective driving of each cell group, the individual select switches $N_1$ to $N_n$ are sequentially turned ON once. In this way, all the photoconductive cells $R_{11}$ to $R_{mn}$ can be selectively driven one after another.

Figure 5:
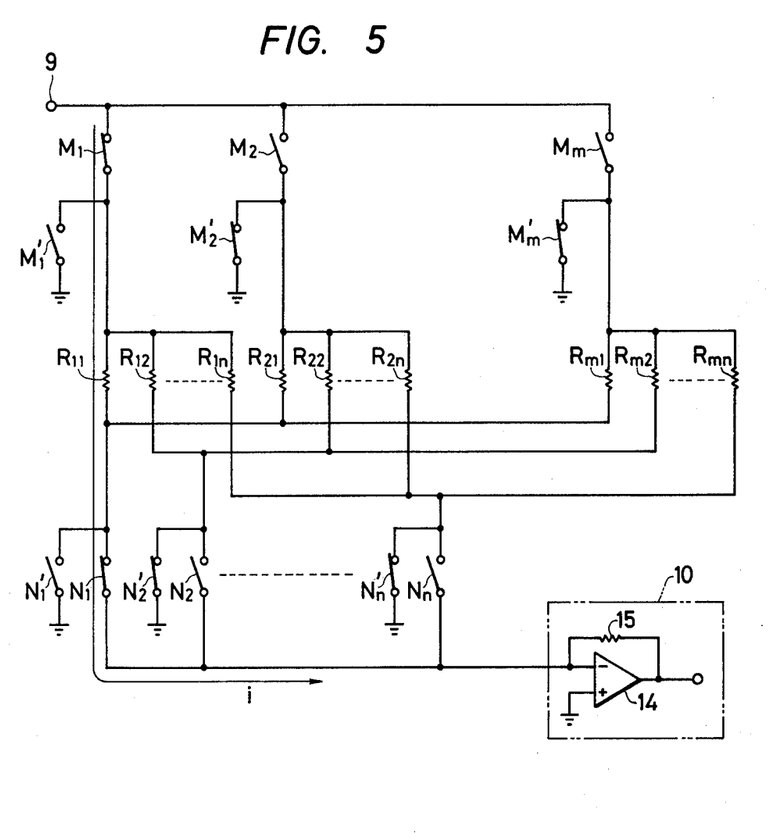
FIG. 5 is a diagram showing an equivalent circuit in the case of the photoconductive cell $R_{11}$ being selected in the image sensor of FIG. 4.
Figure 7:
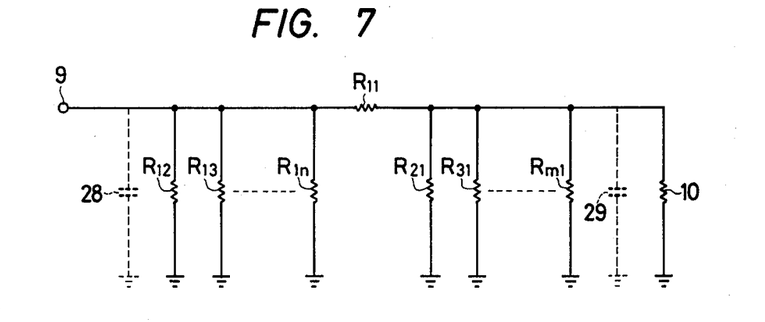
FIG. 7 is a diagram showing an equivalent circuit in the case of the photoconductive cell $R_{11}$ being selected in the image sensor of FIG. 4, with stray capacitances added.

In this operation, those of the select switches $M_1$ to $M_m$ and $N_1$ to $N_n$ which are not selected are grounded on the side of the photoconductive cells through the corresponding ones of the ground switches $M_1'$ to $M_m'$ and $N_1'$ to $N_n'$ which are turned ON, thus preventing the crosstalk current from flowing into the load 10. FIG. 5 shows the circuit connection in the case of the photoconductive cell $R_{11}$ being selectively driven and FIG. 7 shows its equivalent circuit. In this case, the group select switch $M_1$ is turned ON, the ground switch $M_1'$ turned OFF, the individual select switch $N_1$ is turned ON, the ground switch $N_1'$ is turned OFF, the other select switches $M_2$ to $M_m$ and $N_2$ to $N_n$ are turned OFF and the ground switches $M_2'$ to $M_m'$ and $N_2'$ to $N_n'$ are turned ON. By the DC voltage applied from the terminal 9, current i flows via a route [switch $M_1$—photoconductive cell $R_{11}$—switch $N_1$], and this current is provided to the load 10. The resulting output $V_0$ becomes $V_0 = i \cdot R_f$, where $R_f$ is the resistance value of the resistor 15. The input impedance of the load 10 is virtually grounded and the common electrodes sides of the other photoconductive cells $R_{21}$ to $R_{m1}$ connected to the photoconductive cell $R_{11}$ on the side of the individual select electrode are held substantially at the ground potential via the ground switches $M_2'$ to $M_n'$, respectively; hence, no current flows to the photoconductive cells $R_{21}$ to $R_{m1}$. The unselected photoconductive cells of the selected photoconductive cell group $R_1$ are grounded on the side of the common electrode via the ground switches $N_2'$ to $N_n'$, respectively, preventing that the current flowing through the photoconductive cells $R_{12}$ to $R_{1n}$ flow to the load 10. In this way, the crosstalk current described with respect to FIG. 2 does not flow to the load 10. Accordingly, a faithful photoelectric conversion output can be obtained.

The load 10 need not always be a current-voltage converter but may also be a mere resistor as in the case of the prior art example shown in FIG. 1. In such a case, the crosstalk current flows to the photoconductive cells connected in parallel to the load 10, for example, $R_{21}$ to $R_{m1}$ in the embodiment of FIG. 5, but the resistance value of the load 10 is selected sufficiently smaller than a possible minimum parallel resistance value of the photoconductive cells, that is, the parallel resistance value in the case of light of the highest intensity being incident to the photoconductive cells $R_{21}$ to $R_{m1}$; for instance, the resistance value of the load 10 is selected to be under 2% of such a parallel resistance value. For example, in the case where m=54, n=32, the maximum resistance value of the selected photoconductive cell $R_{11}$ (the resistance value of the cell when it is not irradiated by light) is 100 MΩ and the minimum resistance values of the photoconductive cells $R_{21}$ to $R_{m1}$ are each 1 MΩ, the parallel resistance value of the photoconductive cells $R_{21}$ to $R_{m1}$ is about 20 MΩ. If it is intended to suppress the crosstalk current to 1%, the resistance value of the load 10 may be 200Ω or so.

Figure 6:
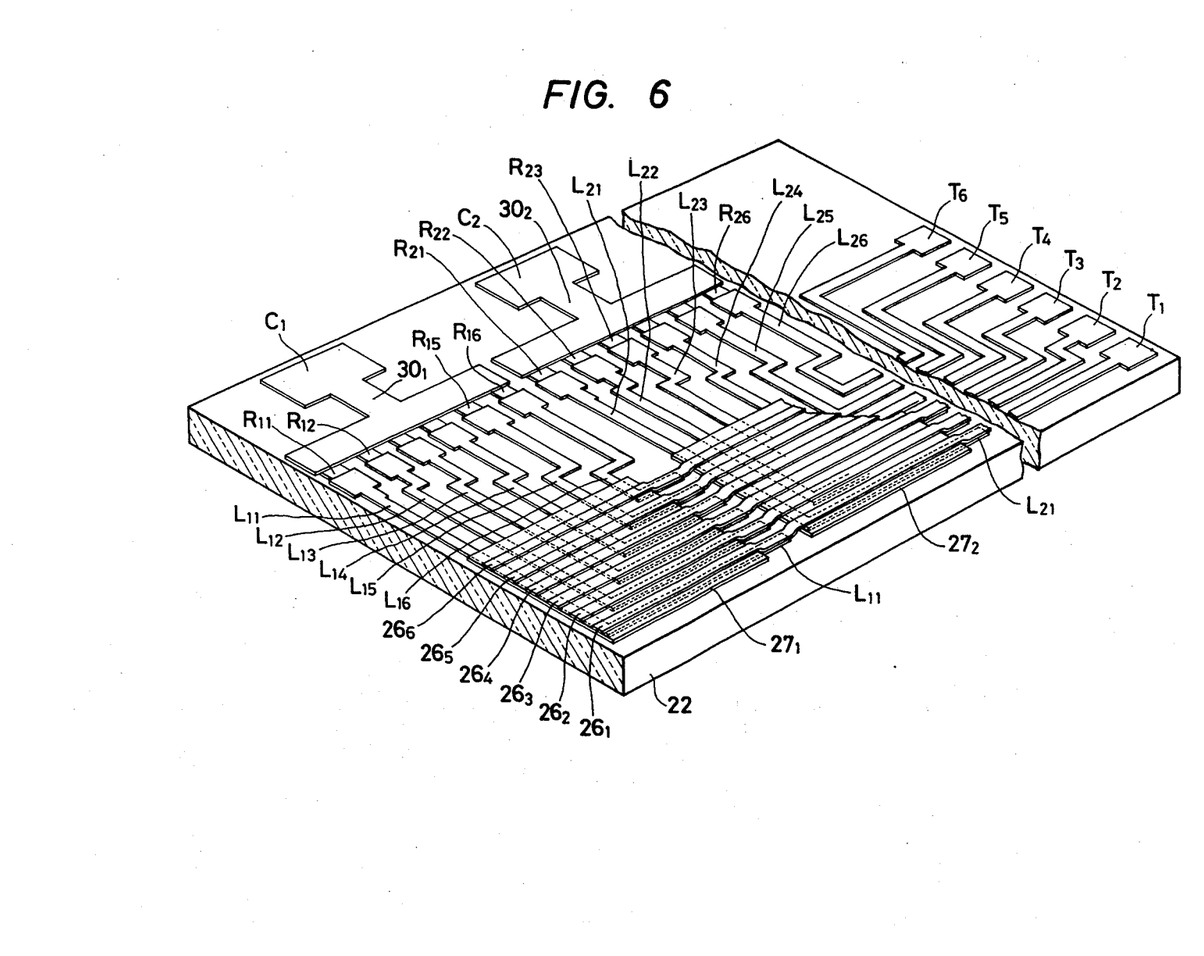
FIG. 6 is a perspective view illustrating, by way of example, the formation of photoconductive cells, common electrodes and individual select electrodes on an insulating substrate.

The photoconductive cells $R_{11}$ to $R_{mn}$, the common electrodes $C_1$ to $C_m$ and the individual select electrodes $T_1$ to $T_n$ are formed by the thin film technology on a common substrate. For instance, as illustrated in FIG. 6, the photoconductive cells $R_{11}$, $R_{12}$, $R_{13}$, . . . as of CdS are arranged by vapor deposition on the insulating substrate 22 as of glass in its lengthwise direction. The photoconductive cells $R_{11}$, $R_{12}$, $R_{13}$, . . . are connected together at one end for each group to common leads $30_1$, $30_2$, . . . , which are, in turn, connected to the common electrodes $C_1$, $C_2$, . . . formed on the substrate 22 along one marginal portion thereof. Leads $L_{11}$, $L_{12}$, $L_{13}$, . . . are connected at one end to the other ends of the photoconductive cells $R_{11}$, $R_{12}$, $R_{13}$, . . . , respectively, and the leads $L_{11}$, $L_{12}$, $L_{13}$, . . . are formed on the substrate 22 to extend in its widthwise direction and then bend to its lengthwise direction. Those portions of the leads $L_{11}$, $L_{12}$, $L_{13}$, . . . which extend in the lengthwise direction of the substrate 22 are covered with insulating films $27_1$, $27_2$, . . . for each photoconductive cell group, and leads $26_1$ to $26_6$ extending in the lengthwise direction of the substrate 22 are arranged on the insulating films $27_1$, $27_2$, ... in the widthwise direction of the substrate 22. Between adjacent ones of the insulating films $27_1$, $27_2$, ... the leads $L_{11}$, $L_{12}$, ... extending from under the insulating films are connected to those of the leads $26_1$ to $26_6$ corresponding thereto by overlapping them. The leads $26_1$ to $26_6$ are connected at one end to the individual select electrodes $T_1$ to $T_6$ formed at one end of the substrate 22.

The arrangement described above eliminates the steps of forming the tellurium film for providing the blocking diodes, involved in the conventional image sensor shown in FIG. 1. As a result of this, the number of masks used is reduced and troublesome operations, such as positioning the masks, are not involved in the manufacture of the device; accordingly, the device is simplified in construction and can be fabricated at low cost, with high production yield. Nonuse of the blocking diodes eliminates the problem of ununiform contact of the photoconductive cells with the tellurium film which has posed a problem in the prior art, making it possible to obtain an image sensor of small dispersion in the outputs of the photoconductive cells. Therefore, although the prior art device cells for a circuit for compensating for dispersion in the cell output, the image sensor of the present invention does not need such a compensation circuit. That is to say, the dispersion in the cell output with respect to the mean output of the conventional image sensor is $\pm 15\%$ or so but, in the image sensor of the present invention, it is in the range of $\pm 10$ to 12% and such dispersion does not affect binary decision. Moreover, in the conventional device, stability of the contact of the photoconductive cells with the tellurium film has not been established, while, according to the present invention, the photoconductive cells make contact with only electrodes as of Ni-Cr-Au alloy and the long term reliability of this contact has already been established; accordingly, an image sensor of high reliability can be obtained.

Furthermore, since the blocking diodes are not employed, the image sensor of the present invention does not encounter the problem of their junction capacitance, and hence is capable of high-speed operation. In addition, in the image sensor of the present invention, the problem of electrode capacitance also matters little. For example, as shown in FIG. 7 which illustrates an equivalent circuit in the case of the photoconductive cell $R_{11}$ being selected in FIG. 4, the photoconductive cell $R_{11}$ is grounded on the side of the common electrode via the photoconductive cells $R_{12}$, $R_{13}$, ... $R_n$ and the composite capacitance 28 of the common electrode $C_1$ and the lead $30_1$ relative to the ground. On the side of the individual select electrode the photoconductive cell $R_{11}$ is grounded via the photoconductive cell $R_{21}$, $R_{31}$, ... $R_{m1}$ and a composite capacitance 29 of the individual select electrode $T_1$ and the leads $L_{11}$ and $26_1$ relative to the ground. The electrodes other than that connected to the selected photoconductive cell are grounded, and hence are small in the capacitance relative to the ground. For instance, the resistance values of the photoconductive cells $R_{11}$ to $R_{1n}$ and $R_{21}$ to $R_{m1}$ are 1 M$\Omega$, the parallel resistance value of the photoconductive cells $R_{12}$ to $R_{1n}$ is 33 K$\Omega$, the parallel resistance value of the photoconductive cells $R_{21}$ to $R_{m1}$ is 18 K$\Omega$, the resistance value of the load 10 is 200$\Omega$, the capacitance 28 is 20 pF and the capacitance 29 is 78 pF. The rise-up of the output voltage of the load 10 depends mainly on the capacitance 29 and the load 10 and the rise time is 0.5 $\mu$sec, which corresponds to 2 MHz and indicates that the image sensor used with one-minute or more high-speed facsimile equipment. In the image sensor of FIG. 1, the rise characteristic of the load output voltage is poor because of the presence of the blocking diodes as described previously and its rise takes as long a time as 10 $\mu$sec (corresponding to 100 KHz), and the image sensor can be used with three-minute facsimile equipment alone.

As described previously, the image sensor of the present invention can be simplified in its manufacturing process but with improved yield and does not require compensation for dispersion in the cell output. Although the ground switches are added, they can be incorporated in a semiconductor integrated circuit together with the select switches and hardly increase the manufacturing costs, and the image sensor of the present invention can be made 30 to 40% cheaper than the conventional image sensors as a whole.

Figure 8:
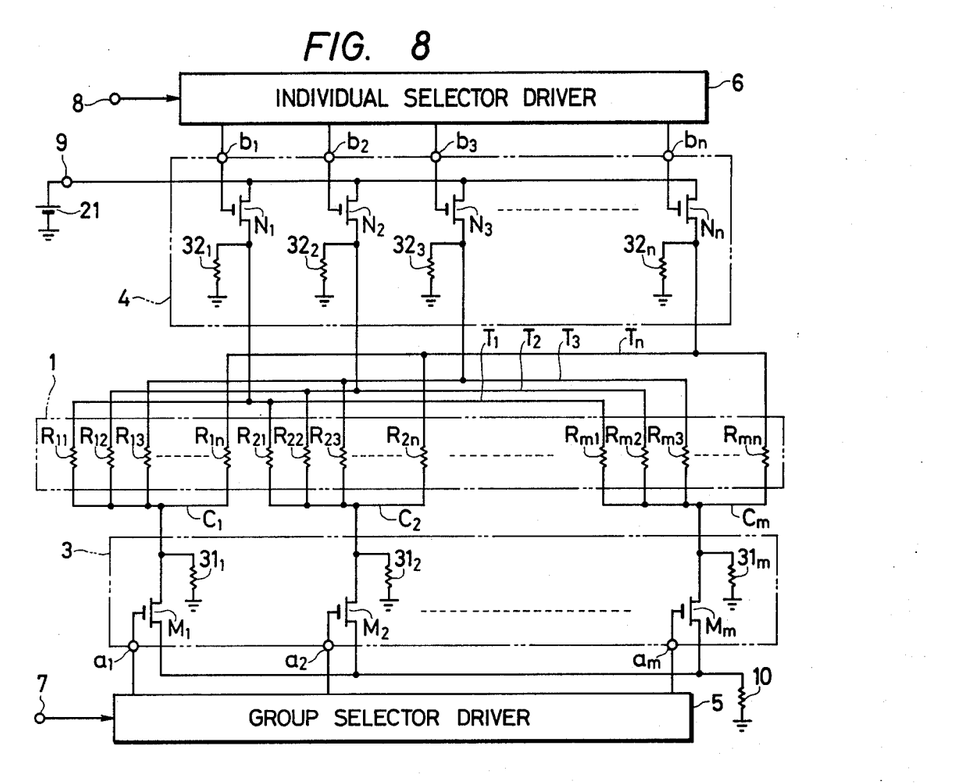
FIG. 8 is a connection diagram illustrating another embodiment of the image sensor of the present invention.

While in the embodiment of FIG. 3 the load 10 is connected to the individual select switches and the power source 21 is connected to the group select switches, it is also possible to connect the power source 21 to the individual select switches and the load 10 to the group select switches. Furthermore, the common electrodes and the individual select electrodes connected to the unselected photoconductive cells are grounded via ground switches but they may also be grounded via resistors. An example of such connection is shown in FIG. 8, in which the part corresponding to those in FIG. 4 are identified by the same reference numerals and characters. In this example, the common electrodes $C_1$ to $C_m$ are grounded via grounding resistors $31_1$ to $31_m$ and the individual select electrodes $T_1$ to $T_n$ are grounded via grounding resistors $32_1$ to $32_n$. Although in this embodiment the load 10 is connected to the side of the group select switches $M_1$ to $M_m$ and the power source 21 is connected to the side of the individual select switches $N_1$ to $N_n$, it is also possible to connect the power source 21 to the side of the group select switches $M_1$ to $M_m$ and the load 10 to the side of the individual select switches $N_1$ to $N_n$.

Figure 9:
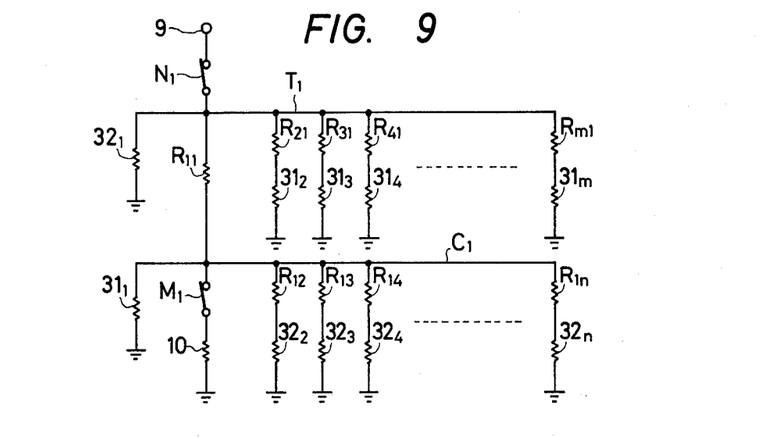
FIG. 9 is a diagram showing an equivalent circuit in the case of the photoconductive cell $R_{11}$ being selected in the image sensor of FIG. 8.

The resistance value of each of the grounding resistors $31_1$ to $31_m$ and $32_1$ to $32_n$ is selected sufficiently smaller than the composite resistance value of photoconductive cells and a grounding resistor connected to the load 10 when one the photoconductive cells is selected; namely, the abovesaid resistance value is selected to be, for instance, less than 2% of the composite resistance value. With the arrangement of FIG. 8, for example, in the case where the group select switch $M_1$ and the individual select switch $N_1$ are turned ON to select the photoconductive cell $R_{11}$, the photoconductive cells $R_{21}$ to $R_{m1}$ connected to the individual select electrode $T_1$ together with the selected photoconductive cell $R_{11}$ are grounded via the grounding resistors $31_2$ to $32_m$ as shown in FIG. 9 and, consequently, currents flowing through these photoconductive cells do not flow to the load 10. The grounding resistor $31_1$ connected to the common electrode $C_1$, to which the selected photoconductive cell $R_{11}$ is connected, and series circuits of the photoconductive cell $R_{12}$ to $R_{1n}$ and the grounding resistors $32_2$ to $32_n$ are connected in parallel to the load 10. Accordingly, the current flowing through the selected photoconductive cell $R_{11}$ flows not only to the load 10 but also to the circuits connected in parallel to the load 10. Since the resistance value of the load 10 is sufficiently smaller than the composite resistance value of the circuits connected in parallel to the load 10 as described previously, the total current flowing from the selected photoconductive cell $R_{11}$ to the circuits parallel to the load 10 is negligible. For instance, in the case where a minimum resistance value of the photoconductive cells $R_{11}$ to $R_{nm}$ is 1 MΩ, the resistance value of each of the grounding resistors $31_1$ to $31_m$ and $32_1$ to $32_n$ is 10 KΩ and the number of the photoconductive cells $R_{12}$ to $R_{1n}$ is 32, the parallel composite resistance value of the photoconductive cells $R_{12}$ to $R_{1n}$ is 1 MΩ/32 and hence about 30 KΩ. Since the resistance value of the grounding resistor $31_1$ is 10 KΩ, the composite resistance value of the circuit connected in parallel to the load 10 is 7.5 KΩ. Accordingly, if the resistance value of the load 10 is selected to be, for example, 1% of the abovesaid composite resistance value, then it is 75Ω. If the voltage at the terminal 9 is 10 V, then the load 10 yields an output of 7.5 mV in the case of the resistance value of the selected photoconductive cell is 1 MΩ.

Figure 10:
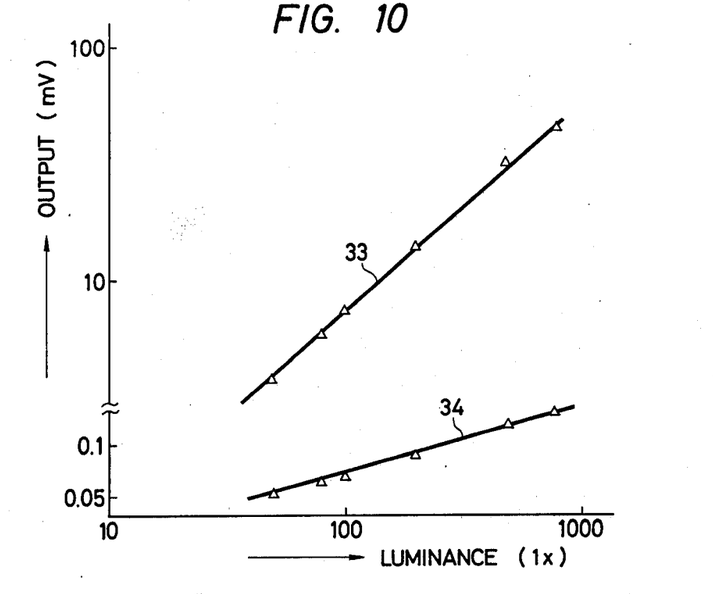
FIG. 10 is a diagram showing measured values of the conversion characteristic of the image sensor of FIG. 8.

FIG. 10 shows results of experiments conducted with the embodiment of FIG. 8. Shown in FIG. 10 are output characteristics obtained in the load 10 in the state in which all unselected photoconductive cells were irradiated by light, the abscissa representing the intensity of the incident light and the ordinate the load output. In FIG. 10, the line 33 shows the load output in the case of a selected photoconductive cell being irradiated by light, and the line 34 the load output in the case of the selected photoconductive cell being not irradiated by light. The voltage at the terminal 9 was 10 V and resistance value of the photoconductive cells irradiated by light of 100 lux illumination was 1 MΩ. When the selected cell was irradiated by light of 100 lux, the load output was 7.5 mV, while, not irradiated, the output was 0.075 to 0.08 mV as can be seen in FIG. 12. The influence of the crosstalk current was kept down to about 1/100 and it was ascertained that the crosstalk would not matter in practice.

The grounding switches and the grounding resistors may also be used in combination, and if the group select section 3 and the individual select section 4 are made identical in construction, then the same circuit structure can be used for either of them. Also in the embodiment of FIG. 8, the current-voltage converter shown in FIG. 4 can be employed as the load 10.

Figure 11:
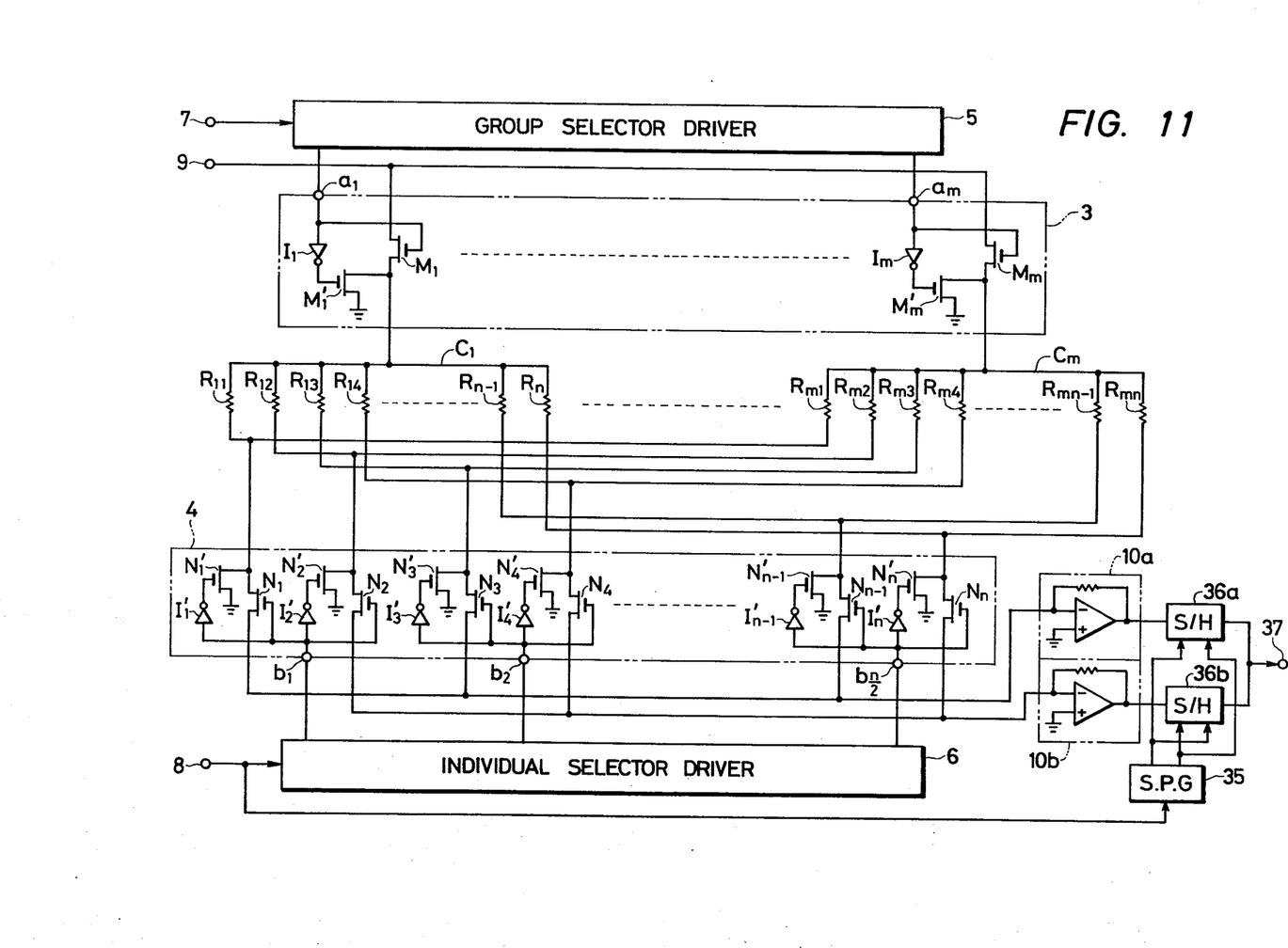
FIG. 11 is a connection diagram illustrating another embodiment of the present invention adapted for high-speed operation.

The reduction of the rise time of the output signal is limited by the capacitances of the electrodes, the leads and the photoconductive cells relative to the ground. Further, the response characteristics of the select switches become poor with an increase in their operating frequency. In view of these points, the operating speed is raised by simultaneously selecting a plurality of photoconductive cells, leading their outputs to individual loads, sequentially sampling and holding the load outputs and combining them into a composite output. An example of the circuit arrangement therefor is illustrated in FIG. 11, in which the parts corresponding to those in FIG. 4 are identified by the same reference numerals and characteris. In this example, adjacent ones of the individual select switches $N_1$ to $N_n$ have their control terminals interconnected in pairs $N_1$ and $N_2$, $N_3$ and $N_4$, . . . $N_{n-1}$ and $N_n$, and they are controlled concurrently. Two loads 10a and 10b are provided. The load 10a is connected to one of each paired photoconductive cells, for example, $N_1$, $N_3$, . . . $N_{n-1}$, whereas the other load 10b is connected to the other cells $N_2$, $N_4$, . . . $N_n$. A sampling pulse generator 35 generates two sampling pulses which are of the same cycle as the clock of the terminal 8 but displaced therefrom a half cycle apart in phase. By these two sampling pulses, the outputs from the loads 10a and 10b are sampled and held in sample hold circuits 36a and 36b, the outputs from which are combined and provided at a terminal 37.

Figure 12A:
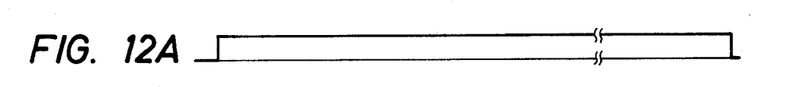
FIGS. 12A to 12G are timing charts explanatory of the operation of the image sensor of FIG. 11.
Figure 12B:
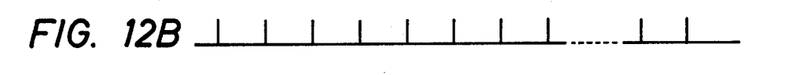
Figure 12C:
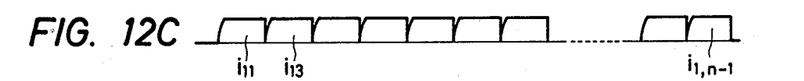
Figure 12D:
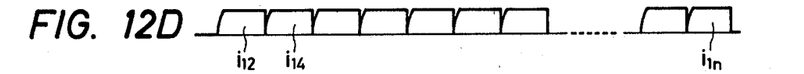
Figure 12E:
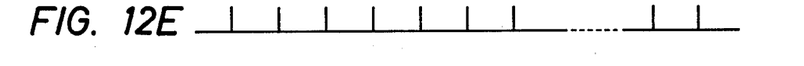
Figure 12F:
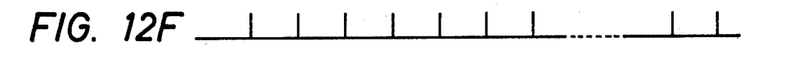
Figure 12G:
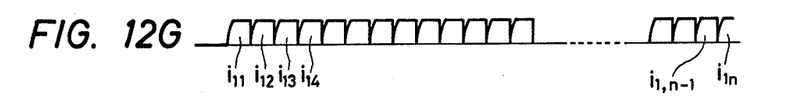

For instance, in the case where the group select switch $M_1$ is turned ON to apply a voltage to the common electrode $C_1$ as shown in FIG. 12A, when a clock pulse shown in FIG. 12B is applied to the terminal 8 in such a state, the photoconductive cells are sequentially selected in pairs upon each occurrence of the clock pulse. At the loads 10a and 10b are simultaneously obtained outputs $i_{11}$ and $i_{12}$ of the photoconductive cells $R_{11}$ and $R_{12}$ as shown in FIGS. 12C and 12D, respectively, and upon occurrence of the next clock pulse, outputs $i_{13}$ and $i_{14}$ of the photoconductive cells $R_{13}$ and $R_{14}$ are provided to the loads 10a and 10b. The two sampling pulses from the sampling pulse generator 35 bear such relationship as shown in FIGS. 12E and 12F to the clock shown in FIG. 12B. The one sampling pulse (FIG. 12E) is delayed behind the clock by a period of time until the load output becomes stable after the application of the clock, and the other sampling pulse (FIG. 12F) is further delayed by a half cycle. By the sampling pulse of FIG. 12E, the output from the load 10a is sampled and held in the sample hold circuit 36a and, at the same time, the sample hold circuit 36b is reset. By the sampling pulse of FIG. 12F, the output from the load 10b is sampled and held in the sample hold circuit 36b and, at the same time, the sample hold circuit 36a is reset. Consequently, the outputs $i_{11}$, $i_{12}$, $i_{13}$, $i_{14}$, . . . of the photoconductive cells $R_{11}$, $R_{12}$, $R_{13}$, $R_{14}$, . . . are sequentially obtained at the terminal 37 at a speec twice higher than the clock from the terminal 8. That is to say, in this embodiment, the output can be obtained at a speed twice higher than the operating speed of the select switches. By increasing the number of photoconductive cells to be selected concurrently and increasing the numbers of loads and sample hold circuits correspondingly, the output can be produced at higher speed without increasing the selective switching speed of the photoconductive cells.

While in the foregoing the CdS elements are employed, other photoconductive cells, such as CdSe, Se and Si cells, may also be used. The select switches and the grounding switches need not always be FETs but may also be bipolar transistors or the like. In any case, the select switches connected to the photoconductive cells on the side of the load are analog switches. The select switches and the grounding switches combined therewith are controlled in reverse directions but it is also possible to constitute one of them by a P type element and the other by an N type element and to omit the inverter. The photoconductive cells may be arranged not only in a straight line but also in two dimensions or matrix. The image sensor of the present invention is not limited in use specifically to the case of reading out each picture element from written or printed matter disposed inclose contact with the sensor and transmitting the image information as a facsimile signal but the image information may also be subjected to editing and other processing. Moreover, the image sensor of the present invention is applicable to instrumentation such as measurement of a length and an area by utilizing the number of successive white (or black) bits in the converted output.

It will be apparent that many modifications and variations may be effected without departing from the scope of the novel concepts of the present invention.

What is claimed is:

1. An image sensor comprising:
   a plurality of photoconductive cells formed on an insulating substrate, the photoconductive cells being divided into m groups, each consisting of n photoconductive cells;
   m common electrodes formed on the insulating substrate and each connected to one end of the photoconductive cells of one of the m groups;
   n individual select electrodes formed on the insulating substrate and each connected to the other ends of corresponding ones of the photoconductive cells of the m groups;
   m group select switches connected at one end to the common electrodes, respectively;
   a group select driver connected to control terminals of the m group select switches, for generating group select pulses to sequentially turn them ON;
   n individual select switches connected at one end to the n individual select electrodes, respectively;
   an individual select driver connected to control terminals of the n individual select switches, for generating individual select pulses to sequentially turn them ON;
   a power source connected to one of the m group select switches and the n individual select switches at the other ends thereof;
   a load connected to the other of the m group select switches and the n individual select switches at the other ends thereof;
   m common electrode grounding means respectively connected to the m common electrodes, for grounding those of the common electrodes connected to those of the group select switches in the OFF state without exerting any substantial influence on the output from the photoconductive cell connected to the group select switch in the ON state and the individual select switch in the ON state at the same time; and
   n individual select electrode grounding means respectively connected to the n individual select electrodes, for grounding therethrough those of the individual select electrodes connected to those of the individual select switches in the OFF state without exerting any substantial influence on the output from the photoconductive cell connected to the group select switch in the ON state and the individual cell select switch in the ON state at the same time;
   wherein the resistance value of the load is selected sufficiently smaller than a composite resistance value of the photoconductive cells connected in parallel to the load when one of the group select switches and one of the individual select switches are turned ON simultaneously.

2. An image sensor according to claim 1 wherein the common electrode grounding means are grounding switches which are connected between the common electrodes and the ground and controlled reversely from the group select switches connected to the common electrodes.

3. An image sensor according to claim 1 wherein the individual select electrode grounding means are grounding switches which are connected between the individual select electrodes and the ground and controlled reversely from the individual select switches connected to the individual select electrodes.

4. An image sensor according to claim 1 wherein the common electrode grounding means are grounding resistors which are connected between the common electrodes and the ground, and the resistance value of each grounding resistor is selected so that the composite resistance value of the photoconductive cells connected in parallel to the load when one of the group select switches and one of the individual select switches are simultaneously turned ON may be sufficiently larger than the resistance value of the load.

5. An image sensor according to claim 1 wherein the individual select electrode grounding means are grounding resistors which are connected between the individual select electrodes and the ground, and the resistance value of each grounding resistor is selected so that the composite resistance value of the photoconductive cells connected in parallel to the load when one of the group select switches and one of the individual select switches are simultaneously turned ON may be sufficiently larger than the resistance value of the load.

6. An image sensor according to claim 1, 2 or 4 wherein the group select switches and the individual select switches are of the same circuit arrangement, and the common electrode grounding means and the individual select electrode grounding means are of the same circuit arrangement.

7. An image sensor according to claims 1 to 5 wherein the load is a current-voltage converter composed of an operational amplifier having its inverted input side connected to the other ends of the group select switches or the individual select switches and having its non-inverted input side grounded, and a feedback resistor connected between the output side and the inverted input side of the operational amplifier.

8. An image sensor according to claim 1 wherein the power source is connected to the other ends of the group select switches; the load is L (an integer larger than unity by which N can be divided out) in number; the other ends of the individual select switches are sequentially distributed and connected to the L loads; the individual select switches are turned ON one at a time; the outputs from the L loads are respectively sampled and held in L sample and hold circuits by sampling pulses of the same period as the individual select pulses and sequentially displaced 1/L of the period apart in phase; and the outputs from the L sample hold circuits are combined by combining means.

* * * * *